United States Patent [19]
Kershaw

[11] Patent Number: 5,299,811
[45] Date of Patent: Apr. 5, 1994

[54] SEAL MEMBER MOUNTED IN HOUSING POCKET BY RESILIENT RETAINING MEMBER

[75] Inventor: Peter A. Kershaw, London, Canada

[73] Assignee: Siemens Automotive Limited, Chatham, Canada

[21] Appl. No.: 995,483

[22] Filed: Dec. 23, 1992

[51] Int. Cl.⁵ .............................................. F16J 15/32
[52] U.S. Cl. ......................................... 277/1; 277/47; 277/50; 277/152; 277/189
[58] Field of Search ................... 277/1, 35-37, 277/47-51, 136, 137, 152, 189

[56] References Cited

U.S. PATENT DOCUMENTS

| | | | |
|---|---|---|---|
| 1,918,121 | 7/1933 | Mulhern | 277/35 X |
| 2,088,703 | 8/1937 | Hubbard et al. | 277/49 |
| 2,587,405 | 2/1952 | Stevens et al. | 277/205 X |
| 2,699,345 | 1/1955 | Bales | 277/136 |
| 3,178,191 | 4/1965 | Dodd et al. | 277/189 X |
| 3,250,541 | 5/1966 | McKinven, Jr. | 277/50 X |
| 3,371,937 | 3/1968 | Maeda | 277/189 |
| 3,776,610 | 12/1973 | Harvey | 277/37 X |
| 4,544,168 | 10/1985 | Hans et al. | 277/49 X |
| 4,739,998 | 4/1988 | Steusloff et al. | 277/152 X |
| 5,209,499 | 5/1993 | Ruff, Jr. et al. | 277/35 X |
| 5,209,502 | 5/1993 | Savoia | 277/35 X |

FOREIGN PATENT DOCUMENTS 2184174 6/1987 United Kingdom ................. 277/189

Primary Examiner—William A. Cuchlinski, Jr.
Assistant Examiner—Scott W. Cummings
Attorney, Agent, or Firm—Russel C. Wells; George L. Boller

[57] ABSTRACT

An inexpensive, efficient seal member having a tubular housing member that can be integral to or attached to a frame of a motor to form a ring seal around the shaft of the motor prior to mating the shaft with a pump or other driven device. The flexible elastomer washer member is located in a pocket at the end of the housing. The inner diameter of the flexible elastomer washer member is smaller than the shaft diameter. The thickness of the flexible elastomer washer member is larger than the depth of the pocket and is held in the pocket by a resilient retaining member having a plurality of tangs forming an interference fit with the walls of the housing. Next, the shaft is slidably extended through the flexible elastomer washer member forming the ring seal.

3 Claims, 1 Drawing Sheet

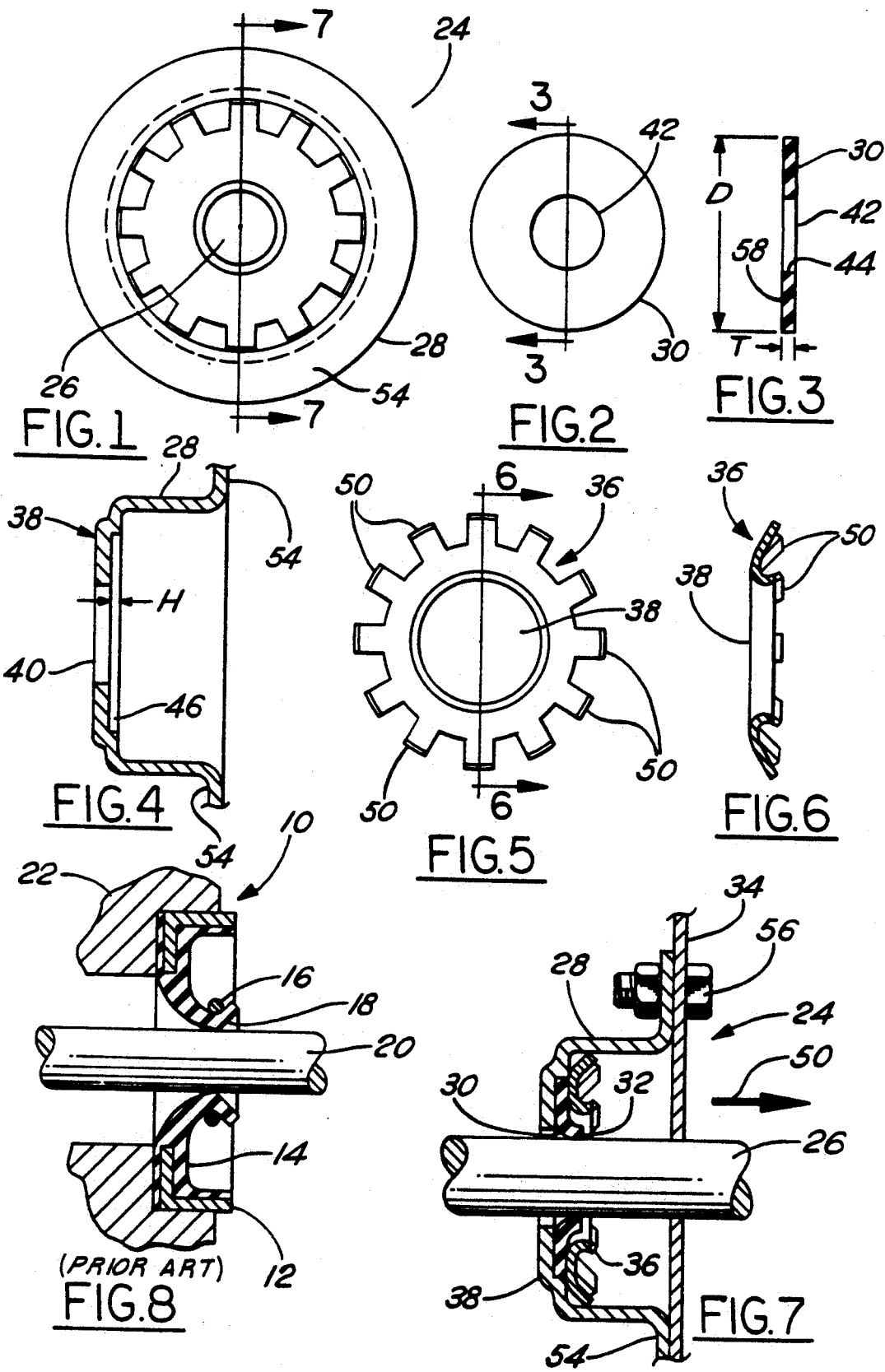

SEAL MEMBER MOUNTED IN HOUSING POCKET BY RESILIENT RETAINING MEMBER

This invention relates to sealing members in general and more particularly to sealing members wherein the pressure differential across the seal member is very small.

BACKGROUND OF THE INVENTION

The world is full of sealing members for use in applications wherein the sealing member functions to seal a bearing from the influx of dirt and grime to retain lubrications such as found in U.S. Pat. No. 3,203,740. Another sealing member typically used in an "o" ring seal which is used to maintain the pressure and fluid on one side of the seal from "leaking" to the other side of seal such as is found in the assembly of fuel injectors to internal combustion engines.

Seals are used to rotate around a housing member such as found in U.S. Pat. No. 4,099,731 wherein the seal rotates with a roll as in a rolling mill. Seals are used as packing materials in applications where in the water or fluid under pressure is to remain on the one side of the seal and not "leak" through to the other side. Seals are used to occupy the space between mating parts to accept normal manufacturing tolerances on such mating parts; an example of such a seal is U.S. Pat. No. 4,383,694.

Seals are made from polytetrafluoroethylene (PTFE) material to function as gaskets. An example of such a PTFE seal is found in EP A2 0 352 608. In each of these types of seals, the pressure differential across the seal is typically high and as such the devices have hard external surfaces and are slightly deformable in order to mate in tight places.

SUMMARY OF THE INVENTION

It has been found in large scale production of motors and pumps that the purpose and function of the some of the seals is to keep one side of the seal free from any fuel, dirt and/or grime found on the other side. An example of such a seal is the seal on the motor shaft. The shaft extends beyond the frame of the motor or a pump. The shaft rotates and the lips of the seal must allow such rotation without reducing its sealing effectiveness.

Typically on a motor mounted to a hydraulic pump, protection must be designed into the motor to exclude any oil, especially brake fluid, flowing from the pump to the motor. Pumps can develop a leak while still generally operating satisfactorily. Hydraulic fluid can destroy a motor very quickly if the fluid comes in contact with the commutator and/or the brushes.

In such applications, both sides of the seal are substantially at the same pressure so that the pressure differential across the seal is either negligible or very small. Typically in the order of 7-103 kPa (1-15 psi) In addition, since such motors or pumps are produced on large capacity production lines, the assembly of the seal must be simple, efficient, inexpensive and easy to accomplish.

In order to solve the problem of having such a inexpensive, efficient seal there is disclosed a seal member having a tubular housing member enclosed at one end which forms part of a motor housing and with a mounting flange means at the other end for mounting the housing member to a frame. The housing member has a central aperture in the one end the diameter of which has sufficient clearance to allow a round shaft to rotate within. A resilient elastomer washer member with a central aperture having a diameter smaller than the diameter of the shaft is placed in a pocket in the housing member. The pocket surrounds the central aperture has a depth less than the thickness of the elastomer washer member and a diameter equal to or slightly larger than the diameter of the washer. The elastomer washer member is located in the pocket of the housing.

A resilient retaining member having an outside diameter which is greater than the inside tubular diameter of the housing has a central aperture with a diameter larger than the shaft diameter, holds the resilient elastomer washer member in the pocket. A plurality of tang members are spaced around the periphery of the retaining member to hold the retaining member in the housing and hold the resilient elastomer washer in the pocket. This is accomplished by having the tang members forming an interference fit with the inner walls of the tubular housing member. The shaft is inserted from the back of the housing member, normally on the side opposite the retaining member, through the aperture in the resilient elastomer washer. The resilient elastomer washer forms a lip ring around the shaft. The material of the resilient elastomer washer is such that the shaft can rotate in the washer, but the lip ring prevents any fluid from passing between the lip ring and the shaft.

DESCRIPTION OF THE DRAWINGS

In the drawings:

FIG. 1 is a plan view of the seal member without a shaft therethrough;

FIG. 2 is a plan view of the resilient elastomer washer member;

FIG. 3 is a sectional view taken along line 3—3 in FIG. 2;

FIG. 4 is a sectional view taken along a diameter of the housing member of FIG. 1;

FIG. 5 is a plan view of the resilient retaining member;

FIG. 6 is a sectional view taken along line 6—6 in FIG. 5;

FIG. 7 is a section view taken along line 7—7 in FIG. 1 rotated 90° showing the seal member with a shaft therethrough; and FIG. 8 is a sectional view taken along a diameter of prior art "lip" seal.

DETAILED DESCRIPTION OF A PREFERRED EMBODIMENT

Referring to FIG. 8, there is illustrated a prior art "lip" seal member 10 having a metal shield 12, a soft elastomer member 14 and a coil or garter spring 16 holding the lips 18 on the shaft 20 at the point of seal. The mechanical stability and rigidity of the lip seal member 10 is achieved typically by insert molding the metal shield 12 into the assembly at the same time as the elastomer member 14 is molded into its final shape. The metal shield 12 allows the elastomer member 14 to be pressed into a housing 22 and remain there while sealing against fluid leaks around the outside of the lip seal member 10 or between the elastomer member 14 and the shaft 20. The feature here and in most other prior art lip seal members 10 is that they typically all use a metal shield 12 of various configurations to mechanically stabilize the seal member 10.

Referring to FIG. 7, there is illustrated in sectional view, a finished assembly of the preferred embodiment the seal member 24 wherein the motor shaft 26 extends from a motor or similar device, not shown, through the seal member 24 and into a pump or other external device, not shown. The shaft 26 is typically supported in a bearing, not shown, in either the external device or internally within the motor. The function of the seal member 24 is to prevent any fluids in the external device or other unwanted particles from flowing into the motor. The mechanical stability of this seal member 24 is in the housing 28 which is a separate part from the resilient elastomer washer member 30. In addition, the seal member 24 of the present embodiment does not require the garter or coil spring 16 to secure the closure of the lip ring 32 about the shaft 26.

In order to accomplish this, the seal member 24 of FIG. 1 functions to seal a shaft 26 extending through a frame 34 with either a negligible or a small pressure difference across the seal member 24. In FIG. 1, the frame 34 is not shown for clarity. In the preferred embodiment, this seal member 24, illustrated in FIGS. 1 and 7, may be used in a motor and pump arrangement wherein the motor is on the left side of the seal member 24 in FIG. 7 and the pump is on the right side. The motor shaft 26 connects the pump and the motor. The seal member 24 comprises a tubular housing member 28, a flexible elastomer washer member 30, and a resilient retaining member 36.

As illustrated in FIG. 4, the tubular housing member 28 is enclosed at one end 38. The tubular housing member 28 is normally an integral part of the motor frame 34. The housing member 28 has a central aperture 40 in the enclosed end 38. The central aperture 40 has a diameter that is larger than the diameter of the shaft 26 which will extend through the seal member 24.

Sealing is accomplished by a flexible elastomer washer member 30 as shown in FIGS. 2 and 3. The elastomer washer member 30 has a predetermined thickness "T" and outside diameter "D" for locating the elastomer washer member 30 in the housing member 28 as will hereinafter be described. The elastomer washer member 30 has a central aperture 42 with a diameter smaller than the diameter of the shaft 26 that will extend through it. The inside diameter 44 of the central aperture 42 will, when the shaft 26 is extended therethrough, forms a lip ring 32 around the shaft thereby sealing the interface between the shaft and the elastomer washer member 30. Since the washer member 30 is fabricated from an elastomer material it will resiliently deform around the shaft 26 and in addition the material is such that the shaft will be free to rotate in the lip ring 32.

The housing member 28 has a pocket 46 surrounding the central aperture 40 for receiving the elastomer washer member 30. The pocket 46 is formed in many ways one of which is by counter boring the surface around the central aperture 40 to a predetermined depth "H". The depth "H" of the pocket 46 is less than the thickness "T" of the elastomer washer member 30 and the diameter of the pocket 46 is approximately equal to or slightly larger than the outside diameter of the elastomer washer member 30. This allows the elastomer washer member 30 to locate in the pocket 46 and extend above the plane of the bottom of the housing member 28. Of course, if the elastomer washer member 30 has any other perimeter shape other than that of a circle, the size of the pocket 46 is approximately equal to or slightly larger than the perimeter of the elastomer washer member 30 in order to accept it.

In order to secure the elastomer washer member 30 in the pocket 46 of the housing member 28, a resilient retaining member 36 is used, such as that illustrated in FIGS. 5 and 6. The resilient retaining member 36 has an outside diameter which is greater than the inside tubular diameter of the housing 28. The resilient retaining member 36 has a central aperture 48 with a diameter larger than the shaft diameter 26 to allow the passage of the shaft therethrough.

A plurality of tang members 50 are spaced around the periphery of the resilient retaining member 36. In the preferred embodiment the tang member 50 are of equal size and are equally spaced although any other configuration may be used. The function of the tang members 50 is to retain the elastomer washer member 30 in the pocket 46 of the housing member 28. In order to accomplish this retention, the tang members 50 form an interference fit with the inner walls of the tubular housing member As illustrated in FIG. 7, the shaft 26 is inserted in elastomer washer member 30 in the direction of the arrow 52. This, because of the deformabililty of the elastomer washer member 30, a lip ring 32 is formed around the shaft. The lip ring 32 prevents the flow of fluid in the direction opposite the arrow 52.

A method for assembling the seal member 24 around a shaft 26 which extends though a frame member 34 as illustrated in FIG. 7, comprises the steps of mounting the tubular housing member 24 in the frame member 34 by means of mounting flanges 54. The mounting may be accomplished by several different fastening means such as the threaded fasteners 56 as illustrated in FIG. 7. Other means of fastening can include welding or riveting. In addition, the housing member 24 may be formed by drawing the material from the frame 34. It is relatively immaterial how the housing is made or secured to a frame or other device.

Next a flexible elastomer washer member 30 is located in a pocket 46 or other receptacle in the housing member 24. The pocket 46 surrounds the central aperture 40 in the one end 38 of the housing and has depth "H" which is less than the thickness "T" of the elastomer washer member 30 so that the elastomer washer member 30 is slightly above the bottom of the housing member 24.

In order to secure and seal the elastomer washer member 30 in the housing 24, a resilient retaining member 36 with a plurality of tang members 50 around its perimeter is pressed against the inside tubular diameter of the housing member 24 and bottoms on the elastomer washer member 30. The resilient retaining member 36 has an central aperture 48 with a diameter larger than the shaft diameter to fit over the end of the shaft 26. The tang members 50 are for retaining the elastomer washer member 30 against the bottom of the pocket 46. In addition the resilient retaining member 36 prevents the elastomer washer member 30 from being pushed in the direction of the arrow 52 in FIG. 7. The tang members 52 form an interference fit with the inner walls of the tubular housing member 28 for locating and securing the elastomer washer member 30 in the housing.

A shaft 26 is then extended through the central aperture 40 in the one end 38 of the housing member 28 in the direction of the arrow 52 in FIG. 7 and through the flexible elastomer washer member 30 in an interference fit relationship to the shaft 26 forming a lip ring 32 around the shaft. The lip ring 32 is formed by the inside diameter edges 44 of the elastomer washer member 30 spreading out along the perimeter of the shaft 26. The outer diameter "D" and the broad inside surface 58 of the elastomer washer member 30 seals against the bottom of the pocket 46 via the force exerted by the resilient retaining member 36.

Thus the seal member 24 of the present invention is simple, effective and permits of easy installation. In addition, because the several parts are few in number, actually two parts and a prepared location including the pocket 46, the seal member 24 is inexpensive to manufacture. As previously stated, the environment of this seal member 24 is one in which the pressure differential across the seal member is small.

I claim:

1. A seal member for sealing a shaft extending through a frame and having a negligible to a small pressure difference across the seal, the seal member comprising:
   a tubular housing member enclosed at one end with a central aperture having a diameter larger than the diameter of the shaft in said one end and having mounting flange means at the other end for mounting said member to a frame;
   a flexible elastomer sealing member having a predetermined thickness and outside diameter, said elastomer sealing member having a central aperture with a diameter smaller than the diameter of the shaft;
   a pocket in said housing member surrounding said central aperture for receiving said flexible elastomer sealing member, said pocket having a depth slightly less than the thickness of said elastomer sealing member and a diameter that is at least equal to the diameter of said elastomer sealing member so that said elastomer washer member locates in said pocket without being biased against the diameter of said pocket; and
   a resilient retaining member having an outside diameter which is greater than the inside tubular diameter of said housing and a central aperture that has a diameter larger than the shaft diameter said retaining member having a plurality of tang members spaced around the periphery thereof for compressing said elastomer sealing member against the bottom of said pocket and forming an interference fit with the inner walls of said tubular housing member for securing and sealing said elastomer sealing member in said housing and around the shaft extending therethrough.

2. A seal member for sealing a shaft according to claim 1 wherein said tubular housing member is an integral part of a motor housing.

3. A method for assembling a seal member around a shaft extending though a frame member, the method comprising the steps of:
   mounting a tubular housing member enclosed at one end in the frame member by means of mounting flanges;
   locating a flexible elastomer sealing member in a pocket having a predetermined depth in the housing member surrounding the central aperture in the one end the flexible elastomer sealing member having a thickness slightly larger than the depth of the pocket;
   pressing a resilient retaining member having a plurality of tang members around its circumference against the inside tubular diameter of the housing, the retaining member having an central aperture that has a diameter larger than the inner diameter of the flexible elastomer sealing member;
   locating the plurality of tang members for retaining the flexible elastomer sealing member against the bottom of the pocket and forming the tang members in an interference fit with the inner walls of the tubular housing member for securing the flexible elastomer sealing member in the housing; and then
   extending the shaft through the central aperture in the flexible elastomer sealing member in an interference fit relationship around the shaft so that the inner diameter of the flexible elastomer sealing member spreads out along the perimeter of the shaft.

* * * * *